United States Patent
Bruhn et al.

(10) Patent No.: US 6,466,789 B1
(45) Date of Patent: Oct. 15, 2002

(54) METHOD AND DEVICE FOR AVOIDING INTERRUPTIONS IN VOICE TRANSMISSIONS

(75) Inventors: Stefan Bruhn, Sollentuna (SE); Karl Hellwig, Wonfurt (DE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/467,623

(22) Filed: Dec. 20, 1999

(30) Foreign Application Priority Data

Dec. 21, 1998 (EP) .............................. 98124179

(51) Int. Cl.⁷ ................................. H04Q 7/38
(52) U.S. Cl. ...................... 455/436; 455/450; 370/331; 370/336; 370/468
(58) Field of Search .................... 455/436, 437, 455/438, 450, 511; 370/331, 336, 337, 347, 468; 704/219; 714/708

(56) References Cited

U.S. PATENT DOCUMENTS 5,291,475 A * 3/1994 Bruckert .................... 370/95.1
5,577,047 A 11/1996 Persson et al. ............. 370/95.3
5,768,314 A 6/1998 Kapadia et al. ............. 375/242
6,285,888 B1 * 9/2001 Ostman ....................... 455/550

OTHER PUBLICATIONS

Maalisma, J., EPO Search Report on EPO Patent Application No. 98124179.7, May 19, 1999, pp. 1–3.

* cited by examiner

*Primary Examiner*—Lee Nguyen
(74) *Attorney, Agent, or Firm*—Jenkens & Gilchrist

(57) ABSTRACT

The invention relates to a method and a device for avoiding interruptions in voice transmission in a cellular communication system. Voice data are thereby divided into segments, and the segments are associated with transmission quanta, so-called bursts. A number of segments is coded in a first transmission mode and is made available for transmission. Said first transmission mode is, for instance, for a transmission at full rate. Additional segments, which follow, are subsequently coded in a second transmission mode and are made available for transmission. The second transmission mode is, for instance, for transmission at half rate. Through the change from a first transmission mode to a second transmission mode, parts of the associated transmission quanta remain unused by applying the so-called interleaving. Said unused transmission quanta are used for performing additional functions, such as initiating a hand-over or FACCH signaling.

20 Claims, 2 Drawing Sheets

METHOD AND DEVICE FOR AVOIDING INTERRUPTIONS IN VOICE TRANSMISSIONS

FIELD OF THE INVENTION

The invention relates to a method and device for avoiding voice interruptions in a cellular communication system, for instance, in a GSM system.

DESCRIPTION OF THE RELATED ART

With a communication via a digital cellular communication system, for instance, the GSM system or the UMTS system (Universal Mobile Telecommunications System) interruptions in voice transmission occur in some cases. One situation in which interruptions occur is when the transmission mode is changed from the full transmission rate, the so-called full rate, to half the transmission rate, the so-called half rate.

Another situation in which interruptions in the voice transmission occur refers to the so-called hand-over, for instance, between cells of a base station. As is generally known, hand-over refers to the automatic delivery of a current voice connection from one cell to another one. In this case, it is detected by first means that a hand-over has to take place, whereupon the connection is switched via a channel in a current cell to another channel in another cell with second means. This is ideally effected in a manner that the user does not realize it, or at least that the interference with the user is reduced to a minimum ("The GSM System for Mobile Communication"; by: M. Mouly et al; Cell & Sys, Paris).

A method for avoiding the complete disconnection of a voice connection in case of a hand-over is known from GB 2 281 177. The method described therein relates to the switching of channels during transition from one cell to another one. According to the method it is suggested that a different time slot is available for the connection in each cell. When moving from one cell to another, at first both time slots are used simultaneously. A first time slot of the previous connection is thereby available serving the maintenance of the quality of the connection, whereas the second time slot is made available for the new connection.

Thus, it is avoided that a connection is discontinued abruptly and completely, however, also a high channel occupancy occurs. Particularly in view of the nowadays existing small resources of transmission capacities and the large-scale traffic in the individual cells this is a disadvantage, as the channels are too strongly occupied resulting in bad quality during voice transmission as well as in short-time interruptions in the voice transmission due to loss of individual voice data containing segments.

Another known method is disclosed in U.S. Pat. No. 5,577,047, which describes a method for a so-called hand-over in a TDMA (Time Division Multiple Access) system. The system consists of a so-called remote station and at least two base stations. The station thereby measures a time delay between signals sent from the base stations and received by the station. On the basis of the time delay, a possible time slot for an additional TDMA channel is detected. Via said channel, an additional signal is sent from the additional base station to the station. The additional signal contains the same information as the first signal. Both signals received by the station are combined in order to provide for a combined signal for the further processing. In the described method, a transmission rate is selected for making the required additional channels available, which corresponds to half the transmission rate of the preceding transmission in order to provide double the number of channels. For this purpose, a transmission being coded at full transmission rate is switched to an additional one being coded at half the transmission rate. Even though a loss or the discontinuation of a transmission during the hand-over from one cell to another cell are avoided in said described method, the switching between the transmission rates is equally subject to an interruption in the transmission resulting in the restricted quality of the voice transmission.

SUMMARY OF THE INVENTION

Accordingly, it is the object of the present invention to provide a method and a device for avoiding the interruption in a voice transmission during hand-over.

Furthermore, it is an object of the invention to provide a method and a device, wherein a switch-over between codings comprising different transmission modes is effected during a voice connection without interrupting the same.

The present invention relates to a method and device for avoiding interruptions in voice transmission in a cellular communication system. The voice data is divided into segments and the segments are associated with the transmissions bursts. A first number of segments are coded with a first transmission mode, while a following segment is coded with a second transmission mode. The unused parts of the associated transmission bursts are utilized for performing additional functions. A random number bit sequence is generated and added to the unused parts of the transmission bursts.

It has thereby proved to be advantageous that the quality of the voice transmission remains constantly in a good condition and that no such interruptions occur, which restrict the sound quality during a connection.

It is equally advantageous that the capacities available are exploited to an optimum, wherein a plurality of voice connections of simultaneous high quality can exist or be built up.

Furthermore, it is an advantage that the method and the device allow a flexible switch-over between transmission processes at different transmission rates, i.e. methods and devices where the segments are coded with different transmission modes, by also allowing high quality of the voice transmission at the same time.

It has proved to be particularly advantageous, during the transmission of signaling information on a FACCH (Fast Associated Control Channel), to use voice segments for a different purpose. Voice segments are not replaced by FACCH segments which result in the loss of the voice segments, but the FACCH are added to the voice segments, wherein the voice quality is not lost or influenced.

It is also advantageous that the invention can be used during both, a hand-over within one cell and a hand-over between different cells.

BRIEF DESCRIPTION OF THE DRAWINGS

In the following, the invention is explained in more detail by means of drawings and embodiments, wherein.

DETAILED DESCRIPTION OF THE DRAWINGS

Figure 1:
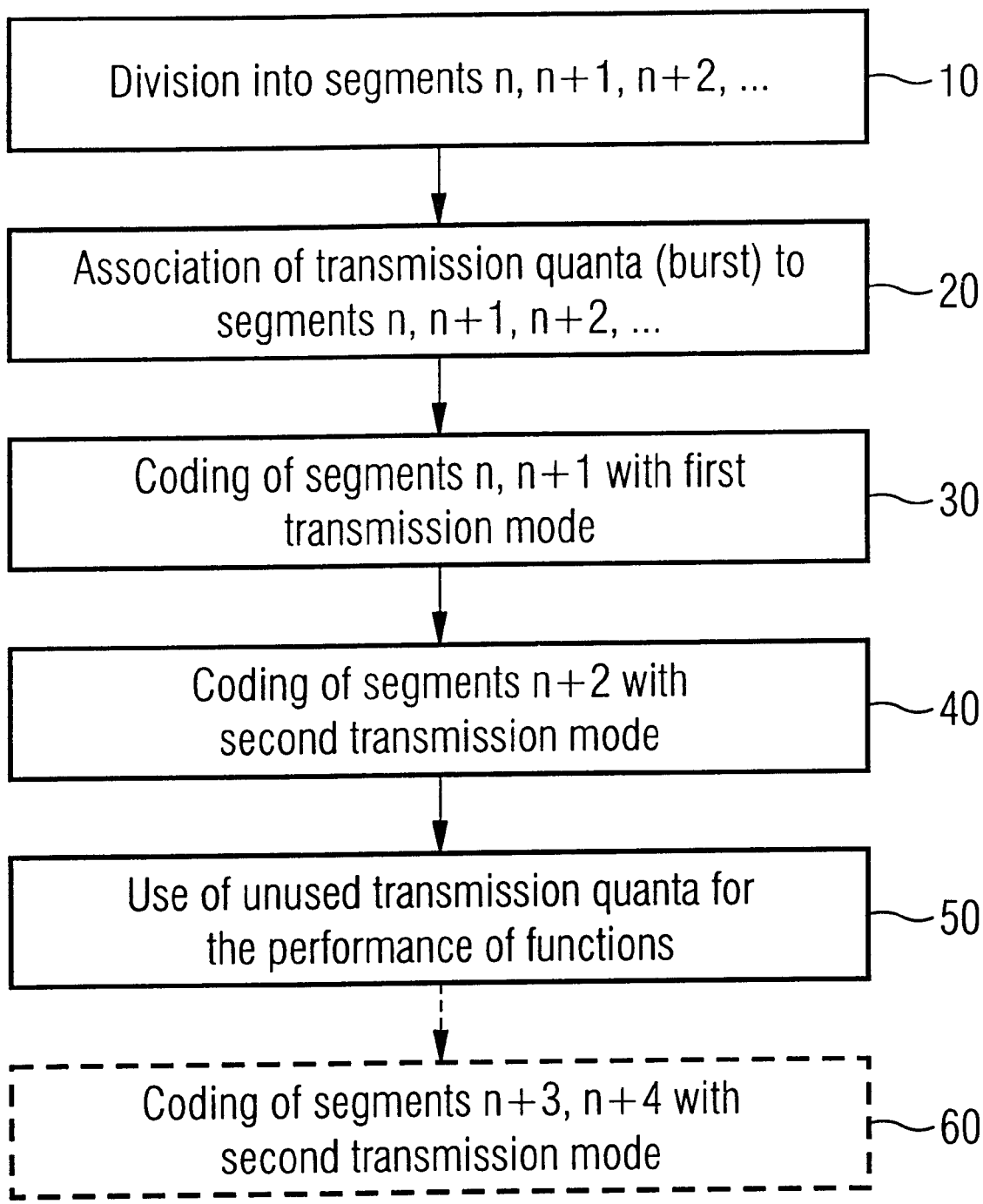
FIG. 1 shows a flowchart of the inventive method according to claim 1.

In the following, the invention is explained in more detail by means of FIG. 1.

In a method for avoiding interruptions in a voice transmission in cellular communication systems, voice data are subdivided into segments n,n+1,n+2, . . . , in a first step 10. The subdivision of the voice data into segments is a common way of proceeding in voice transmission. Voice data are hereby divided, for instance, into segments with a length of 20 ms.

In a further step 20, the segments n,n+1,n+2, . . . , are associated with transmission quanta, so-called bursts. There are different sorts of transmission quanta, for instance, so-called access bursts as well as normal bursts. One form of transmission quantum consists, for instance, of a number of bits. A structure is, for instance, a division into 3 "tail" bits at the beginning and the end of the transmission quantum, a training unit of 26 bits in the center and two information units of 58 bits each located between the ends and the training sequence. Accordingly, a transmission quantum can be divided into two parts of the same structure. The reasons for selecting such a division and arrangement will not be discussed in more detail. Reference is rather made to the prior art.

In another step 30, a first number of segments n,n+1 is coded for the transmission with a first transmission rate. In a subsequent step 40 a following segment n+2 is coded for the further transmission with a second transmission rate. The change of the coding of the segments from a first transmission mode into a second transmission mode is made on the basis of pre-defined events or on the basis of the occurrence of certain states. An example therefor is a hand-over. Before a hand-over is initiated, for instance, a field strength measurement in a terminal is effected. On the basis of the measured field strength, i.e. a certain state of the connection, a hand-over to another cell becomes necessary. This will be entered into in more detail below. Another example is a high channel occupancy within one cell, which makes it inevitable to switch to a transmission method at a low transmission rate. Here, too, the traffic volume within one cell is measured thus initiating the switch-over between the processes. This will also be discussed in more detail later.

In a further step 50, unused parts of the associated transmission quanta will be used for performing additional functions. The unused transmission quanta or parts thereof are formed by already coding the segment for the transmission with a second transmission mode, while the association of the channel is still available for the transmission corresponding to a first transmission mode. This will be explained in more detail by means of additional figures and embodiments.

Moreover, as is illustrated in step 60, the following segments can further be coded with the second transmission mode and transmitted. This is illustrated by the dotted line in FIG. 1, as this corresponds to a possible but not necessary embodiment.

The method for avoiding interruptions in voice transmissions in cellular communication systems is, for instance, applied in GSM systems or in UMTS systems or in an American D-AMPS system or in other cellular communication systems.

In the following, the invention is explained in more detail by means of FIG. 2 and an embodiment.

Figure 2:
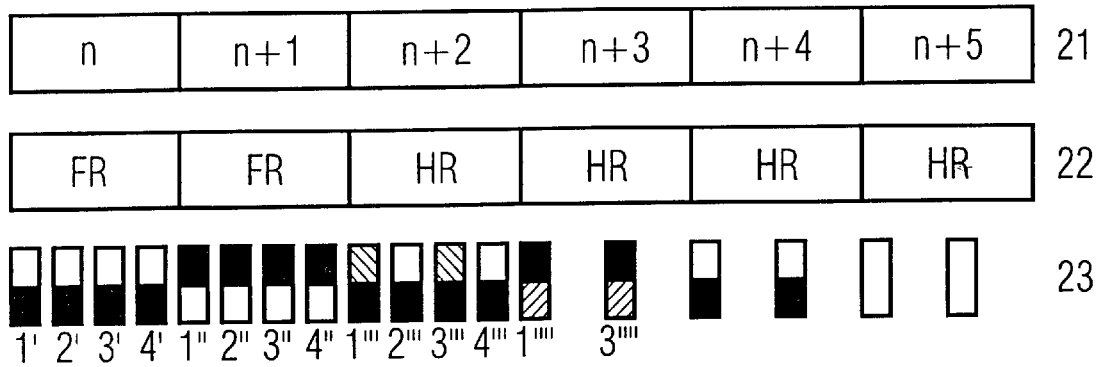
FIG. 2 shows a schematic illustration of the switch-over from full rate to half rate.

FIG. 2 more closely explains the use of the invention when switching between a coding with a first transmission mode and a coding with a second transmission mode during a transmission. The invention, is to be applied, for instance, in a cellular communication system consisting of base stations and mobile stations forming a communication system according to known architectures, for example, GSM.

A switch-over between a coding with a first transmission mode, for instance, at full transmission rate—hereinafter called full rate—and a coding with a second transmission mode, for instance, at half the transmission rate—hereinafter called half rate—is effected, for instance, in the case where a high load or traffic volume occurs on the transmission channels. By switching from full rate to half rate, additional channels for the transmission become available, to be more exact, double the number.

A connection for transmitting voice data is built up between a mobile station and a base station. Due to the above-mentioned reasons, a switch-over between a coding with different transmission modes and a corresponding voice transmission at different transmission rates takes place. For this purpose, the base station and the mobile station agree on the time at which the switch-over takes place.

FIG. 2 illustrates in a first line 21 the division into segments. The segments bear the designation n,n+1,n+2, . . . . A second line 22 indicates the transmission mode in which the respective segment is coded. The first segment n is here coded at full rate FR, the second segment n+1 also at full rate FR. According to the embodiment it is assumed that reasons for a switch-over exist. The base station and the mobile station agree that a switch-over takes place. During the agreement on the switch-over, the current segment is coded in the current transmission mode, i.e. full rate FR. According to the embodiment this is segment n+1. According to the agreement on the switch-over, any additional segment is coded with another transmission mode, i.e. half rate HR. This is, for instance, each segment as of the third segment n+2. Any further segments n+3, . . . are equally coded at half rate HR, as is shown in line 22 of FIG. 2.

Transmission quanta, so-called bursts, are associated with the segments n,n+1,n+2, . . . Each segment is associated with four transmission quanta 1',2',3',4',1",2",3",4",1"' . . . which are formed such that they are each divided into two parts. The transmission quanta are divided into even 2',4',2",4" . . . and uneven 1',3',1",3" . . . positions. During a transmission based on a half rate coding, either the even positions or the uneven positions of the transmission quanta are used for transmission. As to which position is used for the transmission depends on an agreement. The transmission quanta are illustrated in line 23. The division of the transmission quanta themselves again into two parts, for instance, results in a division into two halves, which is preferably effected in that the above-mentioned transmission quanta, the bursts, are built up symmetrically and that each half contains information as well as end bits and training bits.

The third segment n+2 is the first segment coded at half rate HR. According to FIG. 2 the uneven positions 1"',3"', 1"",3"", . . . are used for transmission at half rate. The other positions 2"',4"',2"",4"", . . . remain unused for this transmission and are available to another user.

A transmission at full rate is illustrated in line 23 of FIG. 2, i.e. in the illustration of the transmission quanta, such that the transmission quanta of a current first segment n transmit the first half of information of the current segment, and the transmission quanta of the second segment n+1 transmit the second half of information of the preceding segment. In view of the transmission this process is called "interleaving", which constitutes a common way of proceeding with transmissions. In line 23 of FIG. 2 this is illustrated in that the lower half of the transmission quanta of the first segment n is illustrated in a completely filled manner. So is the upper half of the transmission quanta of the second segment n+1. In the third segment n+2, the first half rate segment, the second half of the preceding segment n+1 is transmitted. This is equally illustrated in that the lower half of the transmission quanta is filled. Also, the first half of the current segment is transmitted in this segment. The second half of the current segment is transmitted in the following segment. As this is the first segment coded at half rate, either the uneven or the even position is used for the transmission. According to the embodiment and according to the determination the uneven position 1'",3'",1"", . . . is used. This is illustrated by the vertically lined halves 1'", 3'41 in segment n+2. Accordingly every second position 2'",4'" is unused. This is illustrated by the empty halves in segment n+2. As the first half of the current segment is transmitted in segment n+2, and the second half of the preceding segment, this is a so called transition segment.

In the transition segment the segments are already coded with the new transmission rate, the association of the channel for the transmission in this segment is, however, still at full rate. This is necessary, as the second half of the preceding segment, i.e. of the last full rate segment, is still to be transmitted. When transmitting the first half at half rate, this results in that two halves of the transmission quanta, namely one half of the transmission quantum 2'" and 4'" remain unused in each case.

The unused halves of the transmission quantum are used for adding signaling bits. Said signaling bits signalize, for instance, that it is switched from full rate to half rate. The signaling bits consist, for instance, of a bit sequence comprising zeros, or the bit sequence is formed by a number of random numbers and is added to the transmission quanta. From this results that the exact hand-over time, i.e. the exact time at which it is switched from the coding with the first transmission mode to the coding with the second transmission mode, does not have to be exactly specified.

The additional segments n+3,n+4 are coded at half rate HR, and the channel coding is equally at half rate. The further transmission quanta are therefore available for a further connection.

Figure 3:
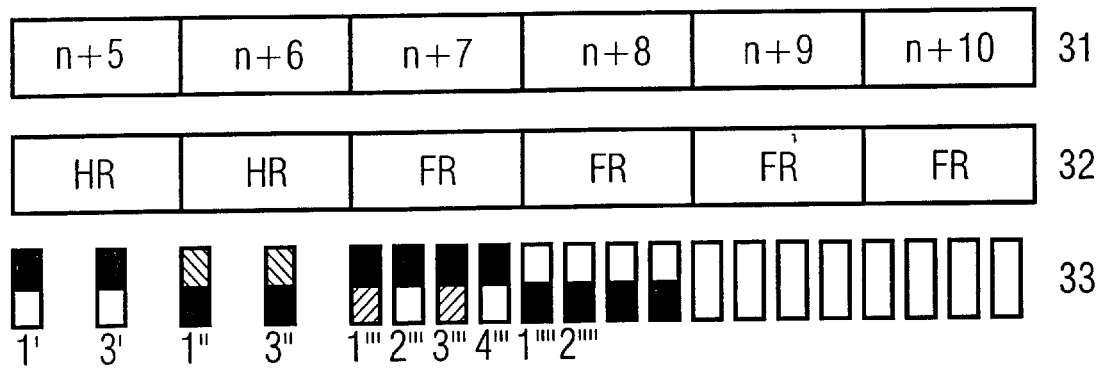
FIG. 3 shows a schematic illustration of the switch-over from half rate to full rate.

In the following, the switch-over from half rate to full rate is explained by means of FIG. 3.

The first line 31 in the figure illustrates a division of the voice data into segments. In this case the segments are depicted as segment n+5,n+6,n+7 . . . Line 32 shows the corresponding transmission modes. Segment n+5 and segment n+6 are both coded at half rate HR. Line 33 shows the transmission quanta 1',2',3',4',1'",2",3",4",1'", . . . In this respect, reference is made to the description of FIG. 2.

The first segment n+5 is coded with a first transmission mode, here half rate HR, just like the second segment n+6. This can be inferred from line 32. The base station and the mobile station agree during a current segment, i.e. n+7, on a switch-over from half rate HR to full rate FR. This occurs, for instance, if sufficient channel capacity is available so that a high transmission rate is available for a transmission. This can, for instance, be helpful and appropriate, if it is switched first from full rate to half rate due to small channel capacity, and sufficient channel capacity is again available thereafter, so that it can be switched again to full rate. Whether there is sufficient channel capacity is determined before. If the agreement on the switch-over takes place in a current segment, for instance, segment n+7, the channel occupancy is already switched to full rate. Thus, the channel is already in a position to allow a transmission at a higher transmission rate. Accordingly, all four transmission quanta per segment are again available, here 1'",2'",3'",4'". This is illustrated in line 33 in connection with segment n+7. In the current segment the second part of the information of the preceding segment n+6 is transmitted in one half of the transmission quanta on the uneven position 1'",3'", which is illustrated by the vertically lined halves. Also, already the first half of the current segment coded at full rate is transmitted, which is illustrated by the filled halves. Accordingly, one half each of the transmission quanta 2'",4'" remains unused and is available for performing another function. In this case, for instance, a bit sequence for signaling the hand-over from one transmission mode into another one is signalized—as was explained above—without the base station and the mobile party agreeing on the exact time.

Figure 4:
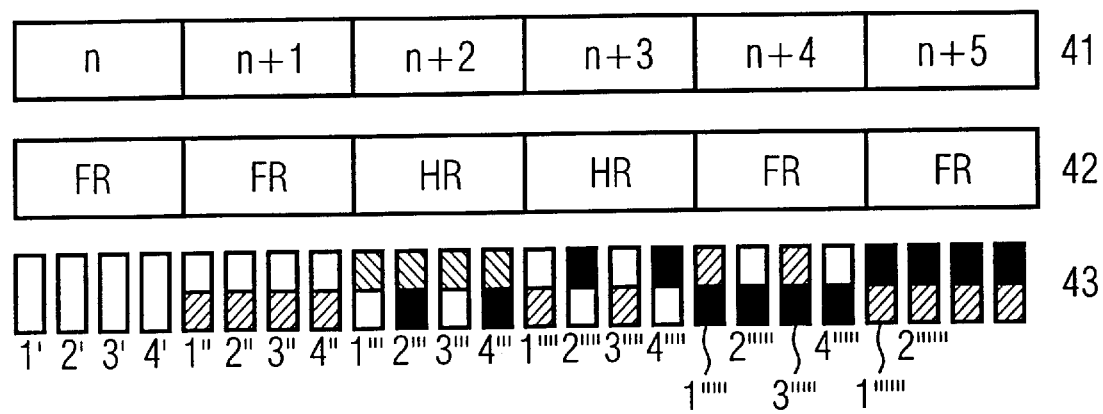
FIG. 4 shows a schematic illustration of a FACCH segment addition.

In the following, a further application of the invention according to claim 5 is explained by means of an embodiment of FIG. 4. The arrangement according to FIG. 4 is identical with the one of FIGS. 3 and 2. In this case, line 41 shows a division of the voice data into a number of segments n,n+1,n+2,n+3, . . . The segments n and n+1 are coded in a first transmission mode, in this case full rate FR. Segments n+2 and n+3 are coded in a second transmission mode, half rate HR. Segments n+4 and n+5 are again coded in the first transmission mode. This can be inferred from line 42. The associated transmission quanta are illustrated in line 43. The transmission quanta are also divided into two parts, preferably halves.

During voice transmission in a cellular communication system, for example, a GSM system, it is also required during a voice connection to also transmit signaling information beside the voice data. Said signaling information makes it feasible for a mobile party and a base station to agree on or check further functions. For signaling during a connection, i.e. a voice transmission, there are two alternatives in view of the GSM. One alternative is known under FACCH (Fast Associated Control Channel) signaling. The FACCH signaling serves, for instance, the hand-over, or the authentification of a party. Said FACCH signaling is effected by adding a FACCH segment.

According to the embodiment the segment n+2 is coded in a second transmission mode. In this case, the second transmission mode must be smaller than the first transmission mode. Accordingly, segment n+2 is coded at half rate HR and is transmitted. Then, the second half of the preceding segment is transmitted in segment n+2. This corresponds to the vertically marked upper half of the transmission quanta in line 43. Also, the first half of the transmission quanta of the current segment n+2 is transmitted. This is illustrated by the black lower half. As a half rate coding has been applied, only every second position is used for transmission. In this case, the even position 2'" and 4'" were selected as an example. The association of the channel continues to be full rate, which is why all positions are available. Accordingly, two halves of transmission quanta remain unused. This corresponds to the lower half of the transmission quanta on position 1'" and 3'", i.e. the uneven positions.

The following segment n+3 is equally coded at half rate. Here, the second half of the preceding segment is transmitted, positions 2"" and 4"", and the first half of the current one, illustrated by the filled transmission quanta of position 1"" and 3"". In this case, a half of the transmission quanta each remains unused. This is continued in the following segment n+4. Here again, a full rate coding takes place, however, on positions 2'''', and 4'''' two halves each remain unused as the second half of the preceding segment is still to be transmitted.

This results accordingly in that 8 halves of transmission quanta remain unused through switch-over of the transmission mode and are available for the performance of further functions. According to the example FACCH segments for signaling are added to those 8 half transmission quanta, which together form a segment. A suitable switch-over for a certain number of segments accordingly permits the performance of a further function in an advantageous manner without influencing the voice connection.

Such a switch-over at a certain time, in order to add further segments, implies that the conditions at a current time are good, i.e. that a connection is of good quality, or that less error correction is involved. On the other hand, a net bit rate of the voice coding can generally be reduced for obtaining the error correction. Another possibility is to increase the transmission power in order to avoid a reduction in quality.

In the following, an application of the invention for a hand-over of a mobile party between cells of different base stations is explained by means of an embodiment (without figure).

A hand-over is required due to the above-explained conditions. In this case, for instance, a hand-over from a first base station to a second base station is initiated. Methods of detecting the necessary time of the hand-over and the implementation thereof are not object of the invention. In this respect, reference is made to generally known methods.

For preparing the hand-over, a channel is reserved between the mobile party and the second base station at full rate coding. After a hand-over command is sent to the mobile party at a fixed time, the following segment with a second transmission mode, here half rate, is coded. The second half of the preceding segment and the first half of the current segment are thereby transmitted. It must be specified as to which positions of the transmission quanta transmit at half rate. The reasons are explained in the following.

As two halves of the transmission quanta remain unused, they can be used for the performance of further functions. This can, for instance, be for the purpose of signaling, or the first half of the half rate coded segment can be sent repeatedly.

As so far merely a transmission between the first base station and the mobile party has taken place, a further connection to the second base station is built up. Both the first base station and the second base station transmit half rate coded segments. Within the connection to the second base station, the first half of the present segment is transmitted in a current transmission.

Due to the simultaneous connection between the mobile party and two base stations it is required that an exact agreement on the position of the transmission quanta is made. For this purpose it is necessary to avoid an overlap in time of sent and received transmission quanta. As, according to the definition, the distance in time between a received and a sent transmission quantum of a mobile party is less than or maximally 3 transmission quanta, this can be obtained by selecting and specifying a position of the transmission quanta.

Thereupon the connection to the second base station is established, while the connection to the first base station is terminated. As these are known methods in GSM and other cellular communication systems, this topic is not discussed in more detail.

Thereupon a full rate coding again takes place, which is why the second half of the preceding half rate coded segment and the first half of the current full rate coded segment are transmitted during the transmission. In this case, too, two halves remain unused and are available for an additional function. This can also be applied, for instance, for signaling or for the repeated transmission of the half rate coded segments.

Such a method implies, as was already explained in the above example, that the quality of the connection is good, and that during an undergoing connection it is possible to switch between the different transmission modes. The above-described methods can also be applied to obtain a good quality.

In the following, the device according to the invention is explained in more detail (without figure).

A device for avoiding interruptions in voice transmission in a cellular communication system comprises first means for dividing the voice data into segments n,n+1,n+2, . . . , . Further, said means associate transmission quanta, the so-called bursts, with the segments n,n+1,n+2, . . .

The device further comprises first coding means for coding a first number of segments n,n+1 for the transmission in a first transmission mode. Also, the device comprises second coding means for coding a following segment n+2 for the transmission in a second transmission mode. The first and the second transmission mode are thereby always different ones, and unused parts, preferably halves, of the transmission quanta remain.

The device further comprises means for adding information to the unused parts of the associated transmission quanta, wherein the unused parts are used for performing additional functions.

Said information can, for instance, consist of a random number bit sequence or of a bit sequence consisting of zeros. For this purpose, additional means for generating a random number bit sequence or means for generating a bit sequence consisting of zeros are provided. Also, means for adding the bit sequences to the unused parts of the transmission quanta are provided.

According to an advantageous embodiment of the invention means for adding FACCH segments for signaling are provided. As a complete segment consisting of four transmission quanta is added, whereas unused transmission quanta only appear in a distributed manner, it must be guaranteed that the FACHH segment can be added in a distributed manner.

What is claimed is:

1. A method for avoiding interruptions in voice transmission in a cellular communication system, said method comprising the steps of:

dividing voice data into segments;

associating transmission bursts with said segments;

coding a first number of segments for the transmission with a first transmission mode;

coding a following segment for the transmission with a second transmission mode; and using unused parts of the associated transmission bursts for performing additional functions, wherein a bit sequence for signaling a switch-over of the coding with different transmission modes is added to the unused parts of the associated transmission bursts.

2. The method according to claim 1,
wherein the unused parts of the associated transmission bursts comprise halves of selected bursts.

3. The method according to claim 1,
wherein each additional segment is coded for transmission with the second transmission mode.

4. The method according to claim 1, wherein a signaling of a hand-over between cells of a base station of the cellular communication system is effected by means of the unused parts of the associated transmission bursts.

5. The method according to claim 1, wherein a signaling of a hand-over between cells of different base stations of the cellular communication system is effected by means of the unused parts of the associated transmission bursts.

6. The method according to claim 1, wherein a voice transmission in the communication system is transmitted according to a GSM standard.

7. The method according to claim 1, wherein a voice transmission in the communication system is transmitted according to a D-AMPS standard.

8. A method for avoiding interruptions in voice transmission in a cellular communication system, said method comprising the steps of:

dividing voice data into segments;

associating transmission bursts with said segments;

coding a first number of segments for the transmission with a first transmission mode;

coding a following segment for the transmission with a second transmission mode; and using unused parts of the associated transmission burst for performing additional functions, wherein FACCH (Fast Associated Control Channel) segments for signaling are added to the unused parts of the associated transmission bursts.

9. The method according to claim 8,
wherein the unused parts of the associated transmission burst comprise halves of selected burts.

10. The method according to claim 8,
wherein each additional segment is coded for the transmission with the second transmission mode.

11. The method according to claim 8,
wherein a signaling of a hand-over between cells of a base station of the cellular communication system is effected by means of the unused parts of the associated transmission burst.

12. The method according to claim 8,
wherein a signaling of a hand-over between cells of different base stations of the cellular communication system is effected by means of the unused parts of the associated transmission burst.

13. The method according to claim 8,
wherein a voice transmission in the communication system is transmitted according to a GSM standard.

14. The method according to claim 8,
wherein a voice transmission in the communication system is transmitted according to a D-AMPS standard.

15. A device for avoiding interruptions in voice transmission in a cellular communication system, said device comprising:

first means for dividing the voice data into segments and for associating transmission bursts with the segments;

first coding means for coding a first number of segments for the transmission in a first transmission mode;

second coding means for coding a following segment for the transmission in a second transmission mode; and means for adding a bit sequence to unused parts of the associated transmission burst for performing additional functions.

16. The device according to claim 13, wherein said bit sequence comprises a random number bit sequence, further comprising:

means for generating the random number bit sequence.

17. The device according to claim 15, wherein the bit sequence consists of zeros, further comprising:

means for generating the bit sequence consisting of zeros.

18. The device according to claim 15, further comprising:

means for adding FACCH (Fast Associated Control Channel) segments to the unused parts of the transmission burst.

19. A method for avoiding interruption in voice transmission in a cellular communication system, said method comprising the steps of:

dividing voice data into segments;

coding a first number of segments for the transmission with a first transmission mode, wherein a first portion of information in each segment is transmitted in a set of transmission bursts corresponding to the segment and a second portion of information in each segment is transmitted in a following set of transmission bursts;

coding a following segment for the transmission with a second transmission mode, wherein a set of transmission bursts corresponding to said following segment includes a first portion of information from said following segment and a second portion of information from a segment of said first number of segments; and transmitting information for performing at least one additional function in an unused part of the set of transmission bursts corresponding to said following segment.

20. The method according to claim 19, wherein each transmission burst includes a first part containing information from a current segment and a second part containing information from an immediately preceding segment.

* * * * *